United States Patent
Thoms

(10) Patent No.: US 9,029,821 B2
(45) Date of Patent: May 12, 2015

(54) DEVICE FOR READING OUT ESPECIALLY FLEXIBLE IMAGING PLATES

(76) Inventor: Michael Thoms, Bietigheim-Bissingen (DE)

( * ) Notice: Subject to any disclaimer, the term of this patent is extended or adjusted under 35 U.S.C. 154(b) by 1512 days.

(21) Appl. No.: 11/992,624

(22) PCT Filed: Aug. 23, 2006

(86) PCT No.: PCT/EP2006/008259
§ 371 (c)(1),
(2), (4) Date: Mar. 23, 2010

(87) PCT Pub. No.: WO2007/036268
PCT Pub. Date: Apr. 5, 2007

(65) Prior Publication Data
US 2010/0171052 A1    Jul. 8, 2010

(30) Foreign Application Priority Data
Sep. 27, 2005 (DE) .................. 10 2005 046 248

(51) Int. Cl.
B65H 5/00 (2006.01)
G03B 42/08 (2006.01)
G03B 42/04 (2006.01)
H04N 1/04 (2006.01)

(52) U.S. Cl.
CPC ............... *G03B 42/08* (2013.01); *G03B 42/04* (2013.01); *H04N 1/04* (2013.01); *H04N 2201/0079* (2013.01); *H04N 2201/0412* (2013.01); *H04N 2201/0422* (2013.01)

(58) Field of Classification Search
USPC ................................................. 250/585, 589
See application file for complete search history.

(56) References Cited

U.S. PATENT DOCUMENTS

| 4,810,874 | A | * | 3/1989 | Torii .............................. 250/589 |
| 4,904,868 | A |   | 2/1990 | Kohda et al. |
| 5,025,157 | A |   | 6/1991 | Katsuaki |
| 5,151,604 | A | * | 9/1992 | Kohda et al. ............... 250/484.4 |
| 5,340,995 | A | * | 8/1994 | Verbeke et al. ............... 250/581 |
| 5,441,251 | A |   | 8/1995 | Ohta |
| 5,461,492 | A |   | 10/1995 | Jones |
| 6,097,475 | A | * | 8/2000 | Jakul et al. ....................... 355/72 |
| 2002/0060303 | A1 |   | 5/2002 | Yonekawa |
| 2002/0063375 | A1 | * | 5/2002 | Minagawa ................. 271/10.01 |

(Continued)

FOREIGN PATENT DOCUMENTS

EP    0 304 060 A1    2/1989
EP    1 209 517 A2    5/2002

(Continued)

*Primary Examiner* — Christine Sung
(74) *Attorney, Agent, or Firm* — Factor Intellectual Property Law Group, Ltd.

(57) ABSTRACT

The invention relates to a device for reading out at least one especially flexible imaging plate. The readout device comprises a reader for reading out information stored on the imaging plate, and a transport device having at least one drive means for transporting the imaging plate relative to the reader along a guide means on the transport path. The shape of the transport path is adapted to the shape of a readout area of the reader. At least one substantially solid support for the imaging plate is provided. The shape and dimension of the support are adapted to the shape of the transport path. When the imaging plate is transported together with the support, the imaging plate does not come into contact with the drive means. The invention also relates to the support for the imaging plate.

44 Claims, 7 Drawing Sheets

(56) References Cited

U.S. PATENT DOCUMENTS

| | | |
|---|---|---|
| 2002/0158216 A1* | 10/2002 | Neriishi et al. ............... 250/584 |
| 2003/0010944 A1* | 1/2003 | Yasuda ......................... 250/584 |
| 2003/0063708 A1 | 4/2003 | Shoji et al. |
| 2003/0209594 A1* | 11/2003 | Alzner .......................... 229/307 |
| 2004/0164252 A1* | 8/2004 | Yonekawa ................. 250/484.4 |
| 2005/0029475 A1* | 2/2005 | Katz ............................. 250/589 |
| 2005/0072938 A1 | 4/2005 | Andou et al. |
| 2005/0095829 A1 | 5/2005 | Hara |
| 2005/0155886 A1* | 7/2005 | Nakajo ......................... 206/455 |

FOREIGN PATENT DOCUMENTS

| | | |
|---|---|---|
| EP | 1 494 068 A1 | 1/2005 |
| EP | 1 521 115 A2 | 4/2005 |
| JP | 4-100000 A1 | 3/1992 |
| JP | 11338078 A * | 12/1999 |
| JP | 2004-212795 A1 | 7/2004 |

* cited by examiner

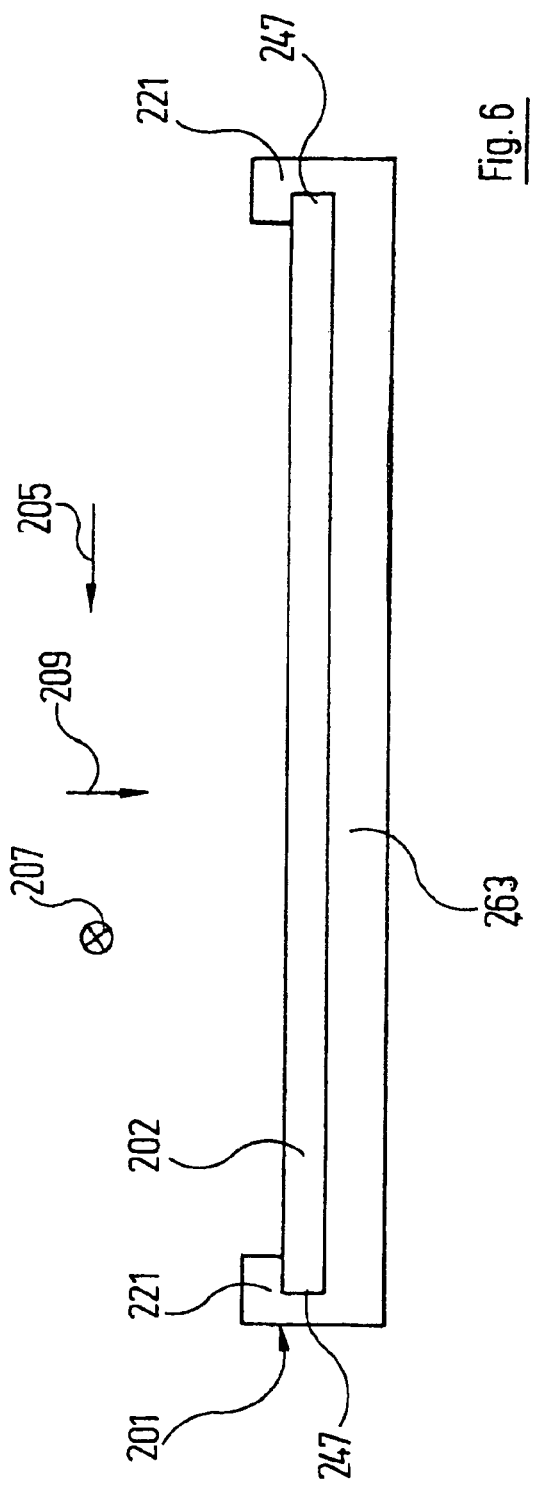
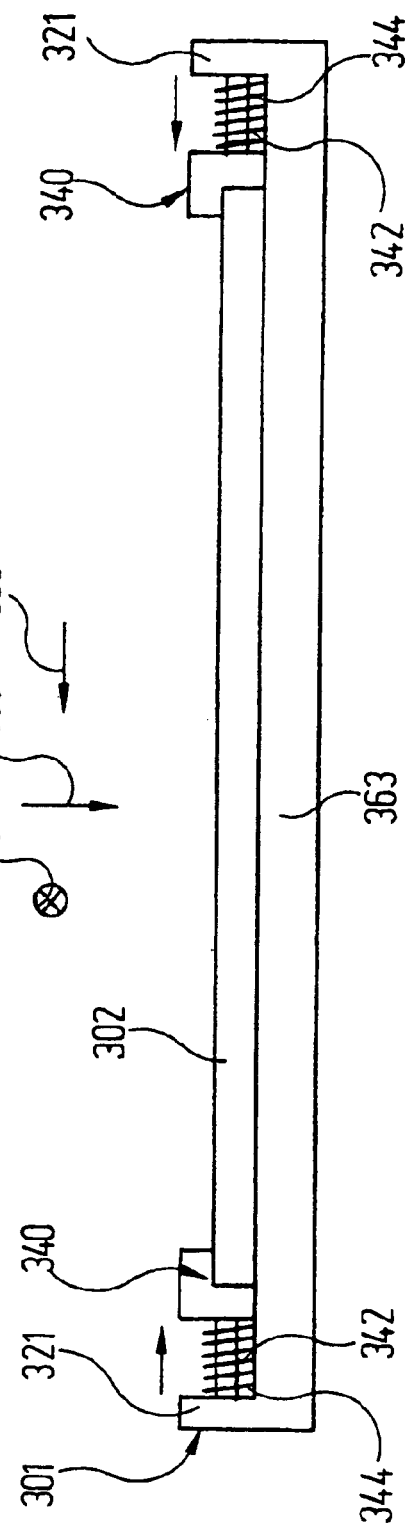

DEVICE FOR READING OUT ESPECIALLY FLEXIBLE IMAGING PLATES

RELATED APPLICATIONS

This application claims the filing benefit of PCT Patent Application No. PCT/EP2006/008259, filed Aug. 23, 2006; which claims the benefit of German Patent Application No. 10 2005 046 248.0, filed Sep. 27, 2005; the contents of all are incorporated herein by reference.

TECHNICAL FIELD

The invention relates to a device for reading out at least one especially flexible imaging plate, the device comprising a reading device for reading out information stored on the imaging plate, and a transport device having at least one drive means for transporting the imaging plate relative to the reading device along a guide means on a transport path, the shape of which is adapted to the shape of a reading region of the readout device.

BACKGROUND OF THE INVENTION

Imaging plates are normally used instead of X-ray films for storing, for example, medical image information, in particular X-ray image information. The image information is read from imaging plates by means of special reading devices, in particular flatbed scanners or drum scanners. For the purpose of readout, the imaging plate is scanned point-by-point, line-by-line or block-by-block by means of a laser beam, and the image information radiated from the imaging plate is acquired by means of an appropriate optical detector and analysed by means of a computer unit. Following readout of the image information, the latter can be erased and the imaging plate reused.

For the purpose of scanning it is known, in the case of conventional readout devices, for the imaging plate to be transported on a transport path by means of a drive means, with its read side containing the image information, along a readout region of the scanner, the laser beam simultaneously tracing the read side of the imaging plate perpendicularly relative to the direction of transport. The image information acquired by means of the detector is acquired jointly with the position of the laser beam on the imaging plate, and assigned to a corresponding image point of the imaging plate.

The profile of the imaging plate is adapted to the shape of the readout region as the imaging plate is transported along the latter. For example, this is a cylindrical shape in the case of drum scanners, or a flat shape in the case of flatbed scanners.

During transport in the readout device, the imaging plate is unprotected, with the result that it is subject to premature wear, particularly in the form of scratches, particularly in the region of drive wheels and/or guide rails. This significantly reduces the number of times that the imaging plates can be reused.

The present invention is directed to addressing these and other matters.

SUMMARY OF THE INVENTION

An object of the present invention is to so design a device of the initially stated type that the loading on the imaging plates, in particular the mechanical loading, is reduced during readout.

The object of the present invention is to so design a device of the initially stated type that the loading on the imaging plates, in particular the mechanical loading, is reduced during readout.

This object may be achieved according to the invention by at least one substantially rigid support for the imaging plate, wherein the shape and dimensions of the support are adapted to the shape of the transport path and the imaging plate does not come into contact with the drive means when the imaging plate is transported with the support.

The wear on the imaging plate is thereby reduced, and its service life thus increased. In addition, handling of the imaging plates arranged in the support is improved, and the imaging plates are therefore delivered more rapidly to the readout device and transported therein.

According to the invention, therefore, the imaging plate is protected by the support at least during the read operation. Direct contact between the imaging plate and, for example, drive wheels of the drive means and/or guide rails or surfaces along the transport path is rendered unnecessary by the support. In this way, scratches and score marks on the imaging plate are prevented to a large extent.

Owing to the shape and dimensions of the support being adapted to the reading device, optimum readout results are ensured even in the case of high transport speeds. For example, transport of the support on the transport path is effected with virtually no backlash, such that the necessary distance between the laser or a corresponding light source of, in particular, the scanner and the read side of the imaging plate is always precisely maintained.

The size of the support will generally depend on the size of the imaging plate. This size may range from small, intraoral central formats of 20×30 mm up to large plate formats of 350×34 mm.

In order that imaging plates without a support can also be delivered to the readout device, an additional drive means may also be provided for imaging plates without a support, said drive means comprising, in particular, an arrangement composed of at least one drive wheel and at least one pressure wheel.

In the case of a particularly advantageous embodiment, the reading device is a flatbed scanner or a drum scanner, in particular for rectangular imaging plates, and the support is correspondingly flat or cylindrically curved, respectively. Particularly good readout results are achievable with flatbed scanners and drum scanners.

Advantageously, the imaging plate is an intraoral imaging plate, which is subject to particular hygienic requirements. Thus, this type of imaging plate is not to come into contact with, in particular, the reading device.

Expediently, the imaging plate can be detachably connected to the support. In this way, the imaging plate can be exposed separately from the support and subsequently connected to the latter for the purpose of readout. For example, an intraoral imaging plate can be packaged in a light-proof manner in a known hygiene sheath. Following X-ray exposure, it is then transferred to the rigid support.

In order that the imaging plate can be arranged in the support in a technically simple manner, the support can be in the form of a cassette and have on one side at least one slot through which the imaging plate can be inserted into the support from a sheath, in particular a hygiene sheath. In this way, the imaging plate can be delivered to the support in a hygienic manner without the necessity of contacting the imaging plate, for example directly from the hygiene sheath that is open on one side.

Furthermore, the support can have, on a side facing towards the read side of the imaging plate, at least one frame on which the imaging plate is positioned. Owing to the frame, the necessary distance between the laser or the corresponding light source and between a detector and the read side of the imaging plate can be fixed in a reproducible manner.

Instead of or in addition to the frame, the support can have, on the side which faces towards the read side of the imaging plate, i.e. on the scanning side, at least one glass-clear plate which is flat or curved in correspondence with the reading device, and in particular is scratch-resistant and/or dirt-repellent, on which the imaging plate is positioned. The fact that this glass-clear surface is scratch-resistant and/or dirt-repellent prevents dirt and scratches, respectively, from appearing in the scanned image.

In order to reduce the wear on the imaging plate resulting from friction on the frame and/or on the plate during insertion, the support can expediently have a lockable cover, by means of which the imaging plate can be fixed in position in the support. By means of the cover, the imaging plate can be pressed onto the frame or the plate only after it has been inserted through the slot which, in particular, has a flap.

In addition, the support can have at least two grooves for receiving at least two in particular opposing edges of the imaging plate. The imaging plate can be guided in the grooves on at least two sides during insertion, and is held in its end position by means of these grooves.

In order to hold the imaging plate in the support, the support can also have a magnetically acting holding means for holding the imaging plate, in particular at least a part of the support can be permanently magnetic and the imaging plate can be coated with a diamagnetic film on its back side that faces away from a read side. The imaging plate is attracted by magnetic forces to the corresponding surface of the support, and held there. In this way, it can be positioned very easily and removed again without leaving behind residues.

Instead of this, the support can comprise at least one electrostatically charged surface for holding the imaging plate, the surface being able to have, in particular, a first electrostatically charged function layer, and a second function layer, which cooperates with the first function layer, being able to be provided on the back side of the imaging plate which faces away from the read side. In this case, it is advantageously possible to dispense with the use of magnetic components.

Alternatively or in addition, the support can have an in particular renewable adhesive layer, for example a double-sided adhesive film, which holds the imaging plate. The use of adhesive layers enables stable connections to be realized. The adhesive layer can then be renewed when the imaging plate is replaced, and the support/the imaging plate can be reused.

It is possible to dispense with the use of magnetically or electrostatically acting components and/or adhesives in the case of a further, alternative embodiment, wherein the support comprises a holding means which acts with negative pressure to hold the imaging plate which has, in particular, a smooth back side, the holding means being able to have, in particular, a spring plunger for generating a negative pressure, and a sealing means, in particular at least one O-ring, for sealing a region which is subjected to the negative pressure and which adjoins the back side of the imaging plate. In this case, the imaging plate is fixed on the corresponding surface of the support by negative pressure. By means of the spring plunger and with the aid of the sealing means, it is possible to generate a permanent negative pressure by means of which the imaging plate can be held for a long time. A very good seal can be achieved with regard to the smooth back side of the imaging plate.

In the case of a further advantageous embodiment, the support can have at least one guide edge as a positioning aid for the imaging plate. The positioning of the imaging plate in or on the support is simplified significantly by means of the guide edge, particularly in the case of use of holding means that act magnetically, electrostatically or with negative pressure or are provided with an adhesive layer.

In the case of a further advantageous embodiment, the support can have at least one clamping device for holding the imaging plate, the clamping device comprising in particular two cooperating clamping elements, which are assigned to opposing edges of the imaging plate, or one clamping element and a guide rail which cooperates therewith and is assigned to an edge of the imaging plate opposite the clamping element; in particular, the regions of the clamping device which act upon the edges of the imaging plate can be composed of a rubber-elastic material.

In the case of cylindrical supports, the imaging plates can be held on two sides, and on all sides in the case of flat supports, by clamping elements, for example in the form of spring catches. The rubber-elastic material with which the surfaces of the clamping elements can preferably be covered prevents the edges of the imaging plate from becoming damaged. The technical resource requirement can be significantly reduced through the use of a rigid guide rail and opposing clamping elements.

The drive means for supports and/or the additional drive means for imaging plates without a support can comprise at least one transport belt or at least one driven roller line or wheel line.

In the case of a further advantageous embodiment, the support, or the imaging plate without a support, can have an in particular removable protective means, in particular a light-proof protective cover, the protective means comprising a connection element for connection to the support, in particular a connection element which acts with positive fit or magnetically or adhesively, in particular provided with an adhesive layer.

The connection element can preferably have a slide connection or plug-in connection, in particular a slide connection or plug-in connection that is automatically detachable prior to readout and automatically closable thereafter.

Preferably, the protective means can be removable, in particular automatically removable, upon insertion before the readout unit in the transport direction and upon removal after the readout unit in the transport direction. This has the advantage that the support is protected from light in the case of operation of the device in illuminated spaces outside the actual read region, in particular until the support is inserted into, for example, a transport duct of a scanner.

Expediently, the removable protective means can be thin-walled and composed of a material of high X-ray transparency, in particular of aluminium or carbon-fibre filled plastic, at least in a region of the light-sensitive layer of the imaging plate. Thus, for example, following use the protective means can be rejoined to the imaging plate, or to the support with the imaging plate, in particular by means of bidirectional guide means, such that X-ray exposure can subsequently be effected directly, without further handling effort by the user.

This is advantageous particularly in the case of use in medical domains, since only few handling operations are required, such that the hygiene conditions are significantly improved.

To enable the support with the imaging plate, or the imaging plate without a support, to be inserted directly into an X-ray device, the protective means can be in the form of an X-ray cassette and have inner guide means for the imaging plate or for the support.

In the case of a further advantageous embodiment, the support can have at least one in particular lockable articulation, by means of which it can be adapted to the profile of the transport path. This is particularly advantageous, for example, in the case of use of imaging plates having large-area, flat exposure geometries, for example in the case of panoramic, cephalometric or medical formats, in combination with a circular readout.

In this case, prior to exposure the support can be equipped with a light-shielding cover that can be stripped off, in particular a cover that is transparent to X-ray radiation. Lockable articulations then enable the support to be brought into the shape required for the reading device, in particular the cylindrical shape in the case of drum scanners.

Furthermore, the outer dimensions of the support can be standardized. In order to simplify the configuration of the transport path within the device, it is expedient if the supports have uniform outer dimensions. In the case of smaller imaging plate formats being used, a support can also be fitted with a plurality of imaging plates.

The front side of the support and, if necessary, that of the protective means, can fit positively to the back side of the support and/or of the protective means. This is advantageous for simplicity of handling and space-saving storage of the support, since a plurality of supports, in particular with the protective means, can be stored one behind or upon one another with virtually no spacing.

Particularly advantageously, at least one slot-shaped opening can be provided in a housing of the device, for inserting and/or removing the support or the imaging plate without a support; in particular, the opening can be closed in a light-proof manner.

Preferably, a swivelling or sliding flap or a brush can be provided, by means of which the opening can be sealed against exterior light. The flap or brush can be so designed that, during their insertion into or removal from support, they bear upon the outer contour of the support and, with the contour of the latter, form a gap that is as small as possible. Since both a flap and a brush always has a contact pressure with regard to the support or with regard to the imaging plate without a support, the flap or brush on the insertion slot or removal slot (for preventing wear and scratches on the read side of the imaging plate) is disposed, not on the read side, but preferably on the back side of the support or of the imaging plate.

In order to guide the support, or the imaging plate without a support, along the transport path, in particular via a scanning slot of the reading device, the guide means for the support and/or the imaging plate without a support can have at least one guide rail or guide groove.

Virtually frictionless transport in the case of frictional contact between the support and the guide means can be rendered possible in the case of a further advantageous embodiment, wherein mutually contacting surfaces of the guide means and of the support that slide relative to each other have a materials pairing, in particular POM on steel or PTFE on hard-anodized aluminium, which realizes a small coefficient of sliding friction.

Alternatively, the support and/or the guide means can have, in mutually adjoining regions, circumferential ball guides or magnetically acting support guide elements, or support guide elements with air bearings, in order to reduce the friction.

For the same reason, the support can have in particular ball-bearing mounted wheels, which run on the guide means.

In order to render possible rapid delivery of a plurality of supports, a region for receiving a multiplicity of supports or imaging plates without supports can be provided before the reading device in the transport direction. In particular, a guide rail or guide groove can be extended correspondingly in this region. A part of the guide means, in particular the guide rails, can also extend in a region that is before the insertion opening as viewed in the transport direction.

At least a part of the transport path can extend in the form of a meander, such that any incident light, in particular before a readout region, for example a scanning slot of the reading device, is blocked.

For this purpose, the transport path can also extend at least partially in an internally blackened transport duct.

In order to render possible transport with the least possible slip and to prevent scratching of the read side of the imaging plate, contacting regions of the drive means, or of the additional drive means, which regions drive the support or the imaging plate, or the imaging plate without a support, can expediently be coated with an elastic material, in particular with rubber or silicone, which produces a strong driving force.

The transport path can extend substantially vertically from top to bottom. The support, or the imaging plate without a support, is then moved by gravity, such that corresponding drive means are required only in the region of the reading device and possibly in the region of an erasing device, which drive means guides the support, or the imaging plate without a support, at the required speed along the readout region or along an erasing region of the reading device. This substantially reduces the technical resource requirement, and thereby the costs.

An air-bearing guide can be provided for the support, or for the imaging plate without a support. The support, or the imaging plate without a support, can then be guided on an air bearing, for example in the transport duct. This has the advantage that the support or, in particular, the read side of the imaging plate without a support, is guided in a contactless manner, and therefore without wear.

In order for supports, and/or imaging plates without a support, of differing formats to be guided laterally in transport, preferably along a wall in the transport duct, a lateral air flow can be provided in the direction of an appliance of the guide means for the support, or for the imaging plate without a support, by means of which air flow the support, or the imaging plate without a support, is guided.

In addition, there can be realized in the transport path separating mechanisms, in particular lifting-magnet axles that reach into the transport path or levers that are attached to motor axles, for separating a multiplicity of supports, or imaging plates without a support, that are guided in succession along the transport path.

Interposition of the separating mechanisms makes it possible to control, for example, processes being executed in succession in corresponding function regions, in particular the separation of the inserted supports from protective means, in particular from light-shielding covers, and their re-mounting in a separating/locking region, the reading-out of the imaging plates in a reading region and the erasing of the imaging plates in an erasing region. This prevents the simultaneous occurrence of a plurality of supports in one of the above-mentioned function regions.

There can additionally be provided at least one means, in particular a light barrier or an in particular mechanical sensor, for the purpose of determining the position of the support, or of the imaging plate without a support. In this way, the transport paths can be monitored, in particular in the region of the separating mechanisms, and it is possible to detect whether further supports, or imaging plates without a support, are in a queue for transfer into the next region. If no further supports are being delivered, the components of the respectively subsequent process stage can be switched to a standby operating mode.

Furthermore, a collecting device for removed supports, or for imaging plates without a support, can be arranged in particular after the reading device in the transport direction, said collecting device having a mechanical, automatically actuated slider for sliding the removed supports, or imaging plates without a support. In this way, a multiplicity of supports, or imaging plates without a support, can be accommodated, in particular ranged in succession, in the output region. By means of the slide, in the case of a vertical transport direction, for example, the supports, or imaging plates without a support, can be pushed away horizontally from the output region by at least one support thickness, or one imaging plate thickness, by the guide means. If appropriate, the guide means can be openable in the output region.

It may be advantageous, for reasons of space, for the supports, or imaging plates without a support, to be tilted and stacked in horizontally aligned layers. In order that all supports, or imaging plates without a support, tilt successively to the same level, the collecting device can expediently be realized as a stacking device for the supports, or for the imaging plates without a support, and have a means for height compensation, in particular a spring-loaded bearing surface. The spring-loaded bearing surface is arranged beneath the stack. It goes down by one support thickness, or one imaging plate thickness, when a further support, or a further imaging plate, is laid on the stack, and the applied weight is thus increased by that of one support, or of one imaging plate. In this way, the respectively uppermost support, or uppermost imaging plate, is always at the same level.

In addition, the collecting device can have a supporting means, in particular at least one mechanical catch, for removed supports, or removed imaging plates without a support. This has the advantage, particularly when the supports, or imaging plates without a support, are placed in succession with their longitudinal axis in the vertical direction, that they are protected against accidents, for example in the case of being shaken. Expediently, the supporting means can be arranged in the horizontal direction with a respective spacing of one support thickness, or one imaging plate thickness.

In order that the supports, or imaging plates without a support, can be removed easily using the fingers, the collecting device can have at least one grip cutout as an aid for removal of the supports, or of imaging plates without a support.

In addition, the guide means can be bidirectional, and the drive means/the additional drive means can act bidirectionally. This has the advantage that, for example in the case of a protective means being used for the support, or for the imaging plate without a support, this support, or this imaging plate without a support, can be conveyed back into the same protective means following the read operation. Moreover, it is thereby possible to dispense with a separate removal opening. It is also possible, however, for only a part of the guide means to be bidirectional in the read region or in the erasing region. There, by means of the corresponding bidirectionally acting drive means, the support, or the imaging plate without a support, can be pushed into the read region/erasing region via, for example, a branch-off, from a main transport path affording passage in one direction. Following the reading/erasing operation, the support, or the imaging plate without a support, can then be transported back in the opposite direction to the main transport path, via the branch-off, by means of the drive means, and transported further in this main transport path in the main transport direction.

In addition, the device can have a control device, by means of which the transport, if appropriate the separating and joining of the supports and protective means, the reading-out and/or if appropriate the erasing of the imaging plate can be controlled, and preferably performed at least in part automatically.

A support, according to the invention, for imaging plates can be used in combination with the above device.

These and other objects and advantages will be made apparent from the following brief description of the drawings and the detailed description of the invention.

BRIEF DESCRIPTION OF THE DRAWINGS

FIG. 6 shows, in schematic form, a longitudinal section of a second exemplary embodiment of a support for an imaging plate, the support having two grooves for inserting and holding the imaging plate;

FIG. 7 shows, in schematic form, a longitudinal section of a third exemplary embodiment of a support for an imaging plate, the support having two spring catches for holding the imaging plate;

DETAILED DESCRIPTION OF THE PRESENT INVENTION

Figure 1:
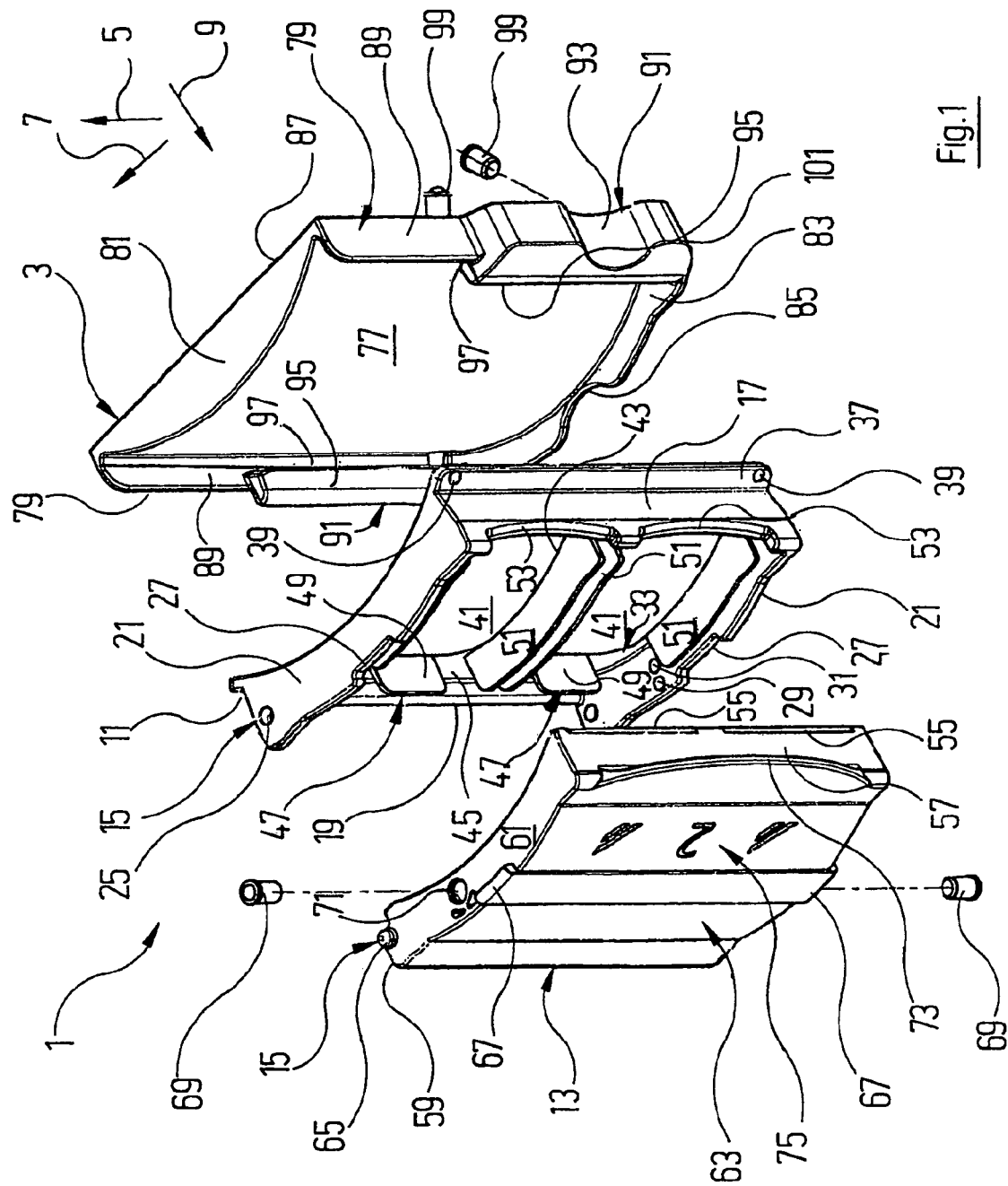
FIG. 1 shows, in schematic form, an exploded drawing of a first exemplary embodiment of a support, in the form of a cassette, for two imaging plates for use in a drum scanner, in this case with a light-shielding cover.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

FIG. 1 shows a rigid cassette, denoted in general by the reference numeral 1, as a support for two rectangular, flexible, intraoral imaging plates, not represented, and a light-shielding cover 3 for the cassette 1.

Figure 2:
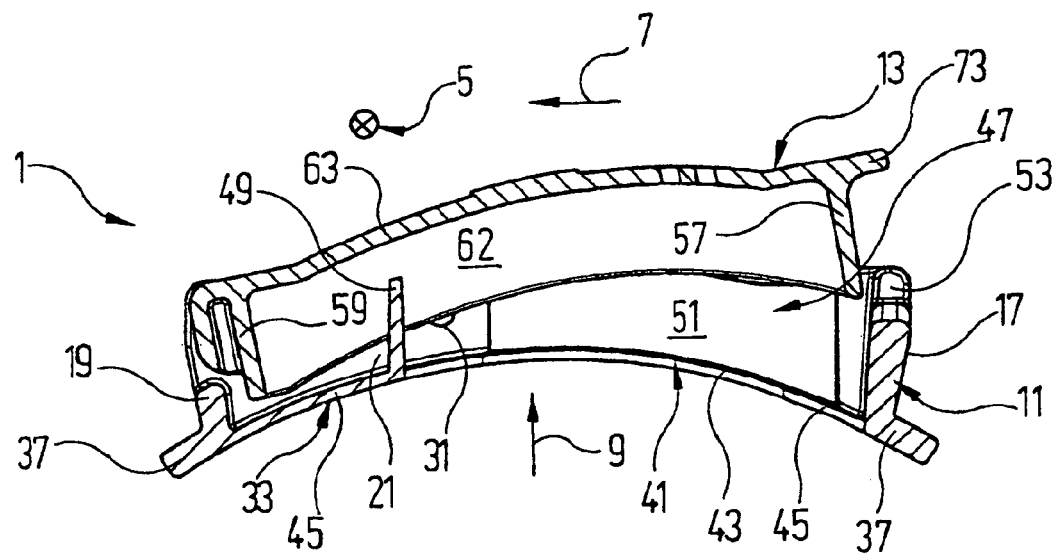
FIG. 2 shows, in schematic form, a section perpendicular to the longitudinal direction of the support from FIG. 1, in this case without a light-shielding cover, a cover of the support being shown in a half-open insertion position for the insertion of the imaging plates.
Figure 3:
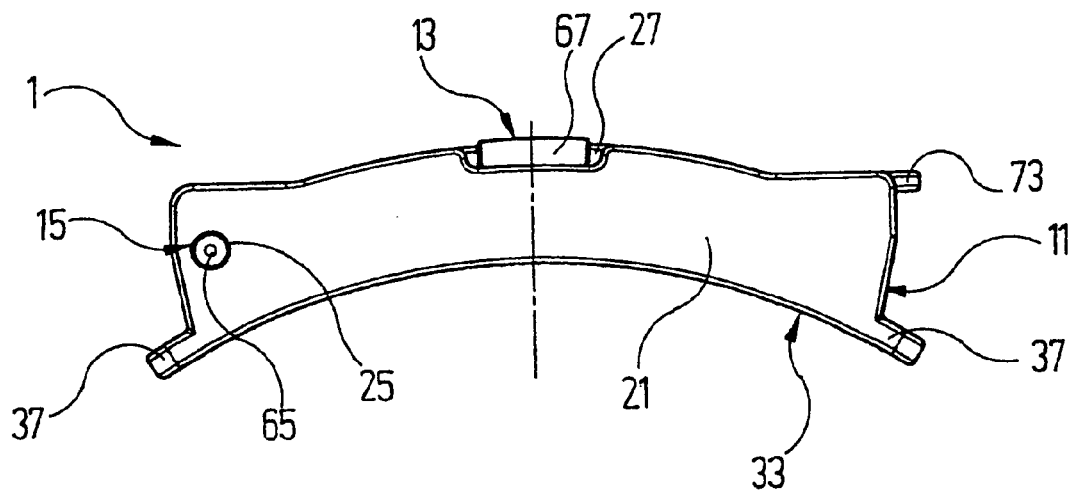
FIG. 3 shows, in schematic form, a view of the support from FIG. 1 as viewed in the longitudinal direction, the cover being closed in this case.
Figure 4:
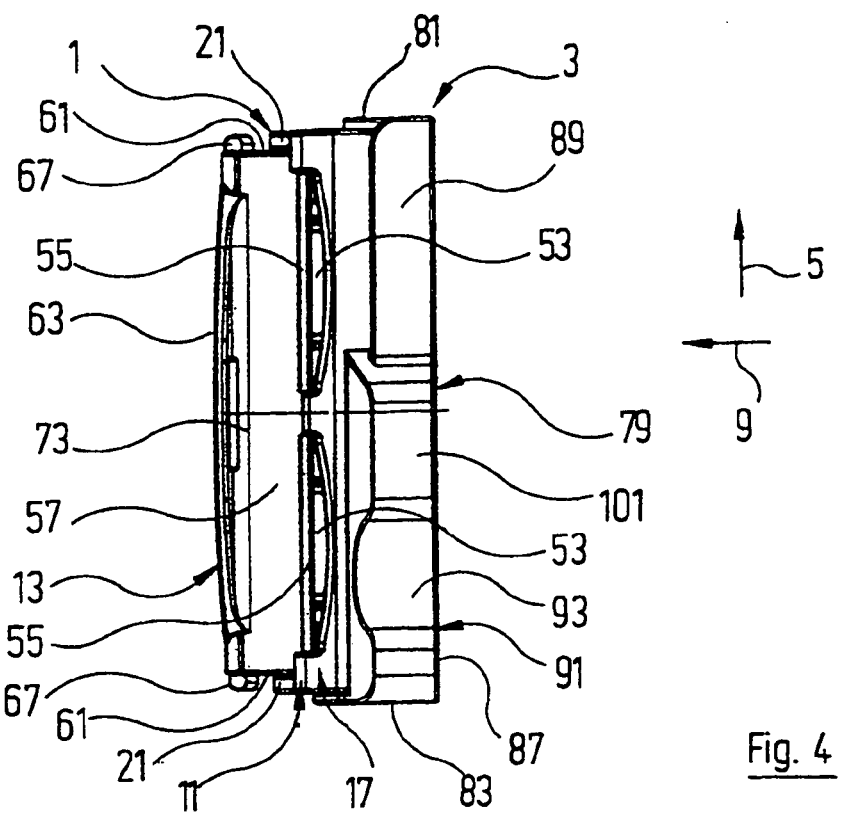
FIG. 4 shows, in schematic form, a side view of the support from FIG. 1, the light-shielding cover in this case having been placed on the support from the read side.
Figure 5:
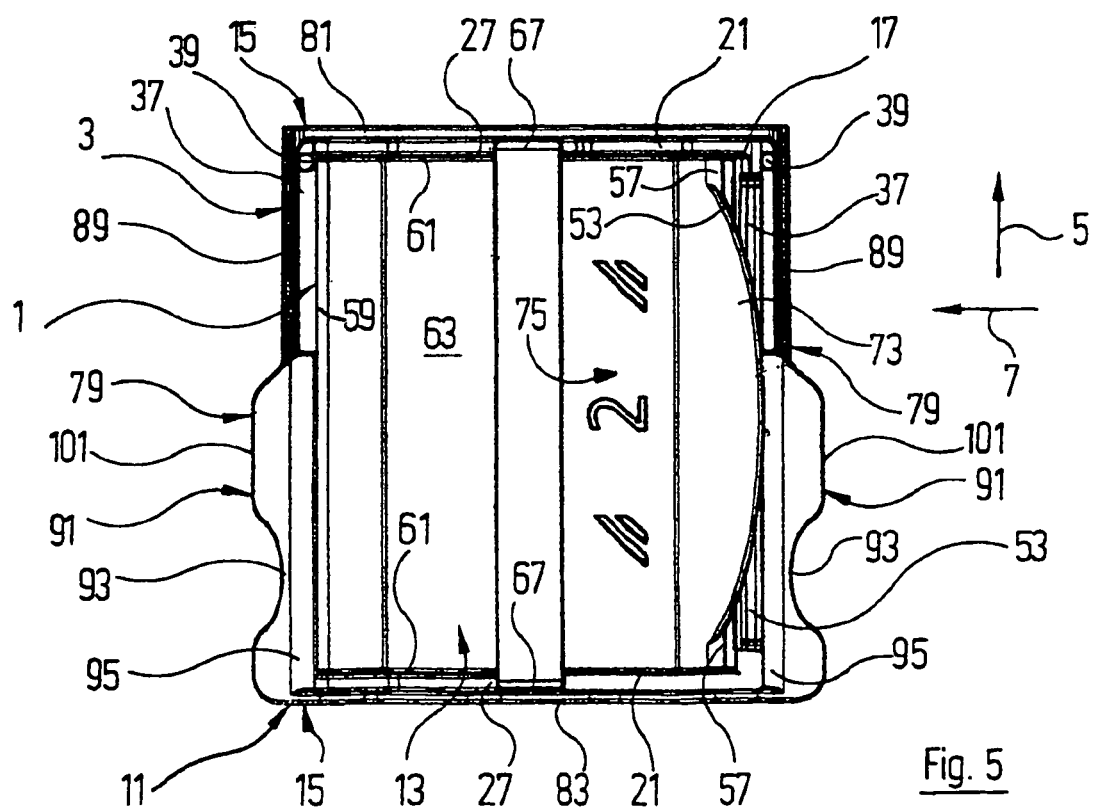
FIG. 5 shows, in schematic form, a cover-side view of the support from FIG. 1, with a light-shielding cover.

FIGS. 2, 3 show the assembled cassette 1 without the light-shielding cover 3 in the longitudinal direction 5, from the bottom in FIG. 1, in a sectional view and a plan view, respectively. FIGS. 4, 5 show, respectively, the cassette 1 with the light-shielding cover 3 from the side in the transverse direction 7, from bottom right to top left in FIG. 1, and in the cover-side view contrary to a reading direction 9, which in FIG. 1 runs from top right to bottom left.

The cassette 1 carrying the light-shielding cover 3 can be delivered to a drum scanner for readout of the imaging plates, and can be transported in the longitudinal direction 5. The imaging plates accommodated in the cassette 1 can be read, in a reading direction 9, by means of a reading device of the drum scanner.

The light-shielding cover 3 can be pushed onto the cassette 1 on the read side, i.e. on the right in FIG. 1, in the longitudinal direction 5, being from bottom to top in FIG. 1.

The cassette 1 joined to the light-shielding cover 3 has substantially the outer dimensions of a conventional X-ray cassette, such that it can be inserted directly into a known X-ray appliance. The shape and the dimensions of the cassette 1 in cross-section, and those of the transport duct, as viewed in the transport direction, are adapted to each other with regard to their profile.

The read side of the cassette 1 is curved cylindrically, in corresponding manner. The cassette 1 and the light-shielding cover 3 are substantially rectangular, as viewed in the reading direction 9.

The cassette 1 comprises a basic body 11, which is in the centre in FIG. 1, with a cover 13, which is shown on the left in FIG. 1.

The cover 13 is pivotally joined to the basic body 11 via two vertically spaced-apart pivot joints 15.

The basic body 11 is bounded in the longitudinal direction 5 by a longitudinal wall 17, which is distant from the pivot joints and at the front in FIG. 1, and by a longitudinal wall 19, which is on the pivot joint side and parallel to the longitudinal wall 17. In the transverse direction 7, it is bounded by two transverse walls 21, which are perpendicular to the longitudinal walls.

The longer read-side edges of the transverse walls 21 are curved with a circular cylindrical surface and, on the back side facing away from the read side, on the left in FIG. 1, as viewed contrary to the reading direction 9, are curved convexly with a circular cylindrical surface, with the same centre of curvature.

In the region of their ends facing towards longitudinal wall 19 on the pivot joint side, the transverse walls 21 have a respective pivot stud bore 25, which is continuous in the longitudinal direction 5. The sides of the transverse walls 21 that are at the back as viewed in the reading direction 9 have a respective positioning lug recess 27, approximately centrally in the transverse direction 7.

Furthermore, a non-continuous inner cover catch hole 29 and an outer cover catch hole 31 are respectively provided in the inner surfaces of the transverse walls 21 that face towards the respectively other transverse wall 21. The cover catch holes 29, 31 are located in a region between the positioning lug recesses 27 and the pivot stud bores 25, close to the positioning lug recess 27. They are arranged close to each other on the arc of a circle whose centre point runs through the axial centre of the respective pivot stud bore 25.

In addition, the basic body 11 is provided with a wall 33 on the read side, in the area bounded by the longitudinal walls 17, 19 and by the transverse walls 21. The front end face of the read-side wall 33 is part of the cylindrical surface of a circular cylinder, whose axis runs in the longitudinal direction 5 on the read side. The centre of curvature of the circular cylinder corresponds to the centres of curvature of the long end faces of the transverse walls 21.

The read-side wall 33 projects somewhat on the one side, in the transverse direction 7, beyond the longitudinal wall 17 that is distant from the pivot joint, and on the other side projects somewhat, to an equal extent, beyond the longitudinal wall 19 that is on the pivot joint side. The projecting regions each constitute an oblong guide web 37 in the longitudinal direction 5.

At both ends of the guide webs 37, at the same distance from the corresponding edge, a respective basic-body catch hole 39 is provided in the web-guide back sides that face away from the read side. The guide webs 37 are respectively mirror-symmetrical with respect to a first plane of symmetry extending perpendicularly relative to the longitudinal direction 5 and are mutually mirror-symmetrical with respect to a second plane of symmetry extending perpendicularly relative to the transverse direction 7.

The read-side wall 33 furthermore has two identical, approximately rectangular read openings 41 succeeding one another in the longitudinal direction 5, which are separated from one another by a transverse region 43 of the read-side wall 33 that extends in the transverse direction 7, and are separated from the longitudinal walls 17, 19 and from the transverse walls 21 by a full-perimeter edge region 45 of the read-side wall 33.

The read openings 41 are each bordered, on the back side of the transverse region 43 and of the edge region 45 of the read-side wall 33, by a rectangular frame 47, which is open at its corners, for loading of the imaging plates.

The frames 47 consist of two longitudinal frame parts 49 and two transverse frame parts 51, respectively arranged in pairs substantially in parallel to each other, which stand perpendicularly on the transverse region 43 and on the full-perimeter edge region 45, respectively, of the read-side wall 33. The frame parts 49, 51 are each rectangular, flat plates, the long sides of the transverse frame parts 51 being curved in correspondence with the curvature of the read-side wall 33.

The top sides of the transverse frame parts 51 that face away from the read-side wall 33 are each curved with the same centre of curvature as the read-side wall 33, apart from a short region on the opening side, and thus extend in parallel to this wall.

The short regions of the top sides of the transverse frame parts 51 on the opening side of the cassette 1, at the bottom right in FIG. 1, are straight. They steplessly adjoin the curved region and are slanted relative to this region, away from the read-side wall 33.

The corresponding top sides of the longitudinal frame parts 49 are located, as viewed in the longitudinal direction 5, on the same level as the extensions of the top sides of the ends of the transverse frame parts 51 that face towards them.

The height of the frames 47 in the longitudinal direction 5, i.e. the distance of their top sides from the read-side wall 33, is defined according to the required distance between a laser or detector of the reading device and the read side of the imaging plate.

The top side of the longitudinal wall 17 that is distant from the pivot joint, which top side faces away from the read side, has two slot hollows 53, which are concave as viewed in the reading direction 9 from the read side, for corresponding insertion slots 55 in the cover 13, which are described more fully further below, for the insertion of the imaging plates. Each slot hollow 53 is assigned to one of the frames 47. The slot hollows 53 project in the longitudinal direction 5 somewhat beyond the extensions of the straight regions of the transverse frame parts 51 of the corresponding frame 47.

The cover 13 of the cassette 1 has, on the opening side, a cover longitudinal wall 57 corresponding to the longitudinal wall 17 that is distant from the pivot joint, a cover longitudinal wall 59, on the pivot joint side, that corresponds to the longitudinal wall 19 on the pivot joint side, and two cover transverse walls 61 corresponding to the transverse walls 21.

A cover central transverse wall 62, which can be seen in FIG. 2, is arranged centrally between the cover walls 61, in parallel thereto. The side of the cover 13 that faces away from the read side is closed by a covering wall 63.

As viewed in the longitudinal direction 5, edges of the covering wall 63, of the cover transverse walls 61 and of the cover central wall 62, which edges are free on the read side, are curved in a substantially circular cylindrical shape, the corresponding cylinder axes extending in the longitudinal direction 5 on the read side, and their profiles corresponding to the respective profiles of the transverse frame parts 51 in the basic body 11 and of the read-side wall 33.

The outer dimensions of the cover 13 in the longitudinal direction 5 and in the transverse direction 7 are somewhat smaller than the corresponding inner dimensions of the basic body 11. Its inner dimensions in the longitudinal direction 5 and in the transverse direction 7 are somewhat larger than the corresponding outer dimensions of the frame 47 in the basic body 11. The cover 13 can therefore be swivelled into the basic body 11, with its walls 57, 59, 61 going foremost into the clearance between the frame 47 and the longitudinal walls 17, 19 and between the frame 47 and the transverse 21 walls of the basic body 11, its cover central transverse wall 62 swivelling in between the two inner transverse walls 21.

In a contact position, with the cover 13 fully swivelled in, i.e. closed, the inside of the covering wall 63 of the cover 13, which inside faces towards the read side, bears directly on the top sides of the frame parts 49, 51 in the basic body 11, and the imaging plates, not represented, that are arranged there are thus pressed against the frame 47 and fixed in position.

The height in the reading direction 9 of the cover transverse walls 61, of the cover central transverse wall 62 and of the cover longitudinal walls 57, 59 is so dimensioned in each case that, when the cover 13 has been closed, their sides on the read side bear in a light-proof manner on the read-side wall 33 of the basic body 11 in the transverse region 43 and in the edge regions 43 of the wall.

The profile of the cover 13, on the side facing away from the read side, corresponds substantially, as viewed in the longitudinal direction 5, with the profile of the light-shielding cover 3 on the read side, such that a plurality of cassettes 1 can be stored one behind the other with a positive fit in the reading direction 9, in a space-saving manner.

The two continuous insertion slots 55, which are open towards the read side, are arranged in succession in the longitudinal direction 5 in the cover longitudinal wall 57 that is distant from the pivot joint, at the read-side ends of this wall. The imaging plates can be inserted into the cassette 1 through the insertion slots 55 when the cover 13 is in the half-open insertion position.

The insertion slots 55 are of approximately the same length in the longitudinal direction 5 as the slot hollows 53 in the basic body 11, preferably somewhat shorter. Their width in the reading direction 9 is somewhat greater than the thickness of the imaging plates.

When the cover 13 is in the plate loading position, the insertion slots 55 are freely accessible behind the respective slot hollows 53, as viewed in the transverse direction 7 from outside the cassette 1, such that the imaging plates can be inserted there.

In the contact position, the insertion slots 55 are covered by the opening-side longitudinal wall 17 of the basic body 11, such that no light can enter the inside of the cassette 1 through the insertion slots.

Furthermore, the cover transverse walls 61, in the region of their ends on the pivot joint side, on their outer sides that face away from the inside of the cassette 1, have a respective spheroidized pivot stud 65, the axis of which extends in the longitudinal direction 5. When the cassette 1 has been assembled, the spheroidized pivot studs 65 are engaged in the corresponding pivot stud bores 25 in the transverse walls 21 of the basic body 11 and, together with these bores, constitute the pivot joints 15 about which the cover 13 can be swivelled for the purpose of closing the cassette 1 and applying contact pressure to the imaging plates relative to the basic body 11.

In addition, the cover transverse walls 61 have a respective positioning lug 67, which is oblong in the transverse direction 7 and corresponds to one of the positioning lug recesses 27 in the transverse walls 21 of the basic body 11. The positioning lugs 67 are located approximately centrally in the region of those long sides of the cover transverse walls 61 which face away from the basic body 11. They are provided on the outer faces of these long sides, and are integrally formed thereon.

The dimensions of the positioning lugs 67 correspond to the inner dimensions of the positioning lug recesses 27. When the cover 13 is fully closed, the positioning lugs 67 engage in the positioning lug recesses 27 and thereby prevent lateral displacement of the cover 13 relative to the basic body 11.

Additionally arranged in each cover transverse wall 61 is a spheroidal catch element 69 which, when the cover 13 is in the half-open insertion position, engages in the corresponding rear cover catch hole 29 and, when the cover 13 is in the closed contact position, engages in the corresponding front cover catch hole 31.

The spheroidal catch elements 69 are each inserted from the outside into corresponding bores 71 in the cover transverse walls 61. The distance between the axes of the spheroidal catch elements 69 and the axes of the corresponding spheroidized pivot studs 65 corresponds to the distance between the centre of the corresponding pivot stud bore 25 and the centres of the cover catch holes in the transverse walls 21 of the basic body 11.

A projection 73, which is oblong in the longitudinal direction 5 and whose free long side has a convexly curved profile, as viewed in the transverse direction 7 from the opening side, projects as an extension of the covering wall 63 beyond the cover longitudinal wall 57 on the opening side. The projection 73 serves as a grip aid, in particular in opening up the cover 13.

In addition, the outer face of the covering wall 63 has a multiplicity of symbols 75, in particular numerals, on the side of the projection 73, which are legible from the latter. The symbols are permanently applied, in predefined size, by means of laser inscription. They are, for example, characteristic of the type of the cassette 1, or are individually assigned to the cassette 1 and thereby to the contained imaging plates. The cassette 1 is identifiable by means of the symbols 75.

The light-shielding cover 3 comprises, on the read side, a light-shielding front wall 77 of thin-walled aluminium, which is rectangular as viewed in the reading direction 9.

The light-shielding front wall 77 is curved in a circular cylindrical form, the cylinder axis extending in the longitudinal-direction 5 on the read side. The centre of curvature is identical with the centre of curvature of the read-side wall 33 of the basic body 11 and that of the covering wall 63 of the cover 13.

The light-shielding front wall 77 is bounded by two mirror-symmetrical light-shielding longitudinal walls 79, by a light-shielding transverse wall 81, which is at the front in the longitudinal direction 5, at the top in FIG. 1, and by a rear light-shielding transverse wall 83. The profile of the light-shielding front wall 77, as viewed in the longitudinal direction 5, and its extent in the longitudinal direction 5 corresponding to the profile and the extent of the read-side wall 33 of the basic body 11.

The distance in the transverse direction 7 between the mutually facing inner sides of the light-shielding longitudinal walls 79 in their front halves, at the top in FIG. 1, corresponds to the distance in the transverse direction 7 between those outer sides of the guide webs 37 of the basic body 11 which face away from the read-side wall 33.

The front side of the light-shielding front wall 77, at the top in FIG. 1, adjoins that side of the front light-shielding transverse wall 81 which faces away from the read side and, as viewed in the longitudinal direction 5, is curved in correspondence with the profile of the light-shielding front wall 77. That read-side side of the front light-shielding transverse wall 81 which is opposite the curved side is straight.

The rear side of the light-shielding front wall 77, at the bottom in FIG. 1, adjoins the inner region of the rear light-shielding transverse wall 83 perpendicularly. That side of the rear light-shielding transverse wall 83 which faces away from the read side is curved and extends substantially in parallel to the curve of intersection of the light-shielding front wall 77 with the rear light-shielding transverse wall 83. It has a release hollow 84 approximately in its centre.

The light-shielding longitudinal walls 79 and the rear light-shielding protective wall 83 constitute the receiving region for the cassette 1.

Moreover, the light-shielding longitudinal walls 79, the front light-shielding transverse wall 81 and the rear light-shielding transverse wall 83 define a bounding face 87 against which a further cassette 1 having identical dimensions can be inserted from the read side in a space-saving manner, with its cover 13 foremost, for the purpose of storing, in particular stacking or ranging in succession, a multiplicity of cassettes 1 having light-shielding covers 3.

The light-shielding longitudinal walls 79 comprise, in their front halves, a respective straight part 89 which adjoins the front light-shielding transverse wall 81, and in their rear halves comprise a holding part 91 having a grip hollow 93. On that side which faces away from the read side and faces towards the cassette 1, the holding part 91 projects in the reading direction 9 over the straight part 89.

The holding parts 91 comprise, in the transverse direction 7, on the side which faces towards the respectively other light-shielding longitudinal wall 79, a holding collar 95, which is oblong in the longitudinal direction 5. The holding collars 95 are provided, at a distance from that face of the light-shielding front wall 77 which faces away from the read side, on that side of the holding parts 91 which faces towards the cassette 1.

This distance is somewhat greater than the thickness of the guide webs 37 of the basic body 11 in the reading direction 9. A region 97 which extends in the longitudinal direction 5 is bounded by respectively one of the holding collars 95 and the light-shielding front wall 77.

The depth of the holding collar 95 in the reading direction 9 is less than the distance between the guide web 37 and those long sides of the slot hollows 53 in the opening-side longitudinal wall 17 of the basic body 11 which face towards the guide web 37, such that the slot hollows 53 are freely accessible when the light-shielding cover 3 has been fitted on (cf. FIG. 5).

The guide webs 37 of the basic body 11 can be inserted from the front in the longitudinal direction 5, from the top in FIG. 1, into the groove-shaped regions 97 between the holding collars 95 and the light-shielding front wall 77, such that the cassette 1 is held in the light-shielding cover 3 with a positive fit.

In the region of those ends of the holding collars 95 which face towards the rear light-shielding transverse wall 83, a respective light-shielding spheroidal catch element 99 is arranged in that face of the holding collars which faces towards the light-shielding front wall 77. When the cassette 1 has been inserted into the light-shielding cover 3, the light-shielding catch elements 99 engage in the corresponding basic-body catch holes 39 in the guide webs 37 of the basic body 11, and thereby fix the cassette 1 in position in the light-shielding cover 3.

Moreover, the holding parts 91, on that outer side which faces away from the respectively other holding part 91, have widened portions 101 which extend in the transverse direction 7.

Provided approximately centrally there, as viewed in the longitudinal direction 5, are the grip hollows 93, which are curved with a cylindrically concave surface, as viewed in the transverse direction 7 from outside the light-shielding cover 3.

Figure 9:
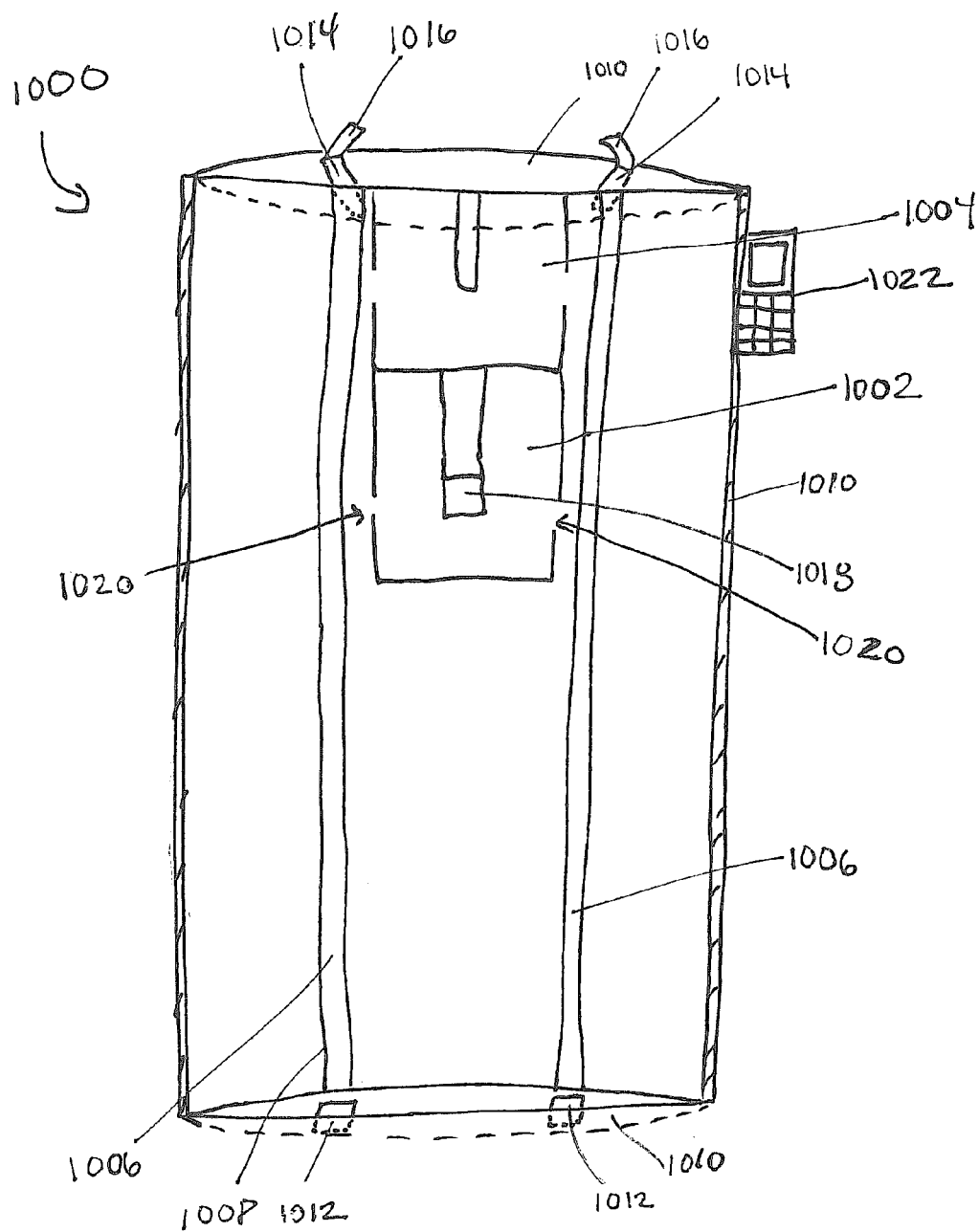
FIG. 9 shows a side perspective partial cutaway view of a drum scanner used in association with the present invention.
Figure 10:
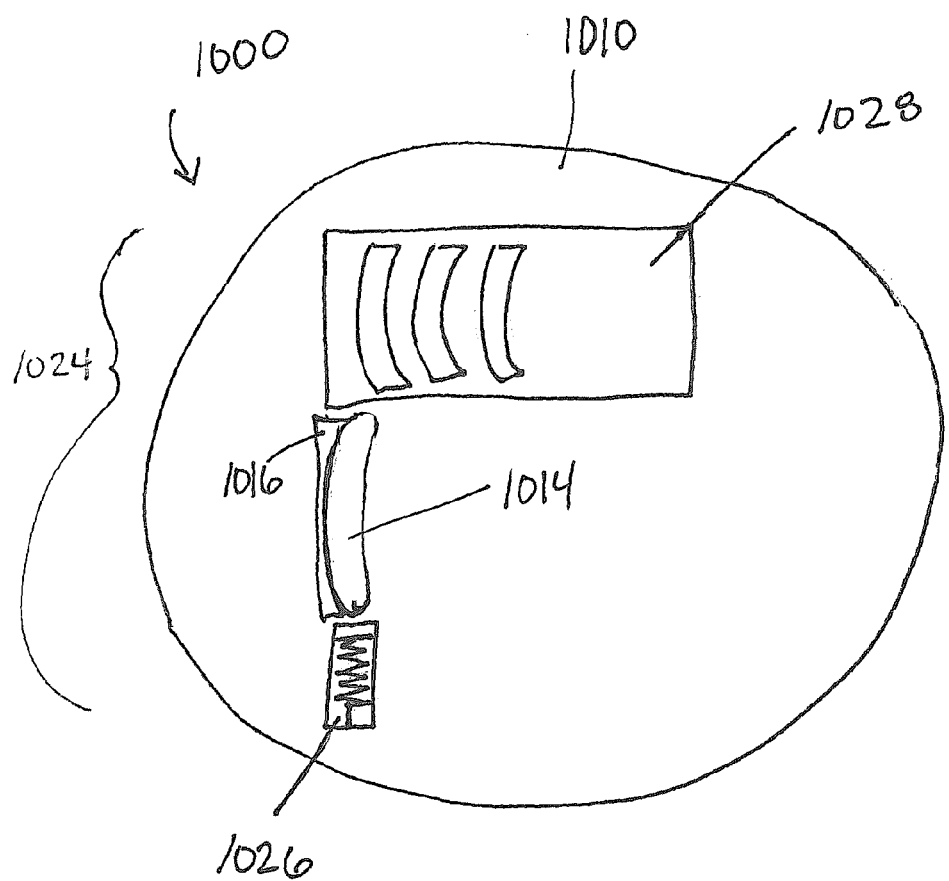
FIG. 10 shows a top view of the drum scanner in FIG. 9 with a collection device.

As shown in FIGS. 9 and 10, the drum scanner 1000 has a known reading device 1002 for point-by-point, line-by-line or block-by-block reading of information stored on the imaging plates. An erasing device 1004 for erasing the imaging plates can be arranged after the reading device 1002 in the transport direction.

In the drum scanner 1000, a transport duct 1006 for cassettes 1 with light-shielding covers 3 leads to the reading device 1002 and to the erasing device 1004. It extends in the form of a meander substantially vertically from top to bottom. Its inner surfaces are blackened.

Guide rails 1008 for the cassettes 1 with light-shielding covers 3 are provided in the transport duct 1006.

The surfaces of the cassette 1, or of the light-shielding cover 3, which are in contact with the guide rails and slide along the latter are composed of PTFE, the corresponding surfaces of the guide rails being of hard-anodized aluminium.

The transport duct 1006 has, at one end in a housing wall 1010 of the drum scanner 1000, a slot-shaped insertion opening 1012, through which the cassettes 1 provided with light-shielding covers 3 can be inserted, and at the other end has a slot-shaped output opening 1014, through which the cassettes 1 with light-shielding covers 3 can be removed.

The profiles of the insertion opening and output opening, as viewed in the transport direction, correspond to the profiles of the cassettes 1 with light-shielding covers 3 as viewed in the longitudinal direction 5, their inner dimensions being somewhat greater than the corresponding outer dimensions of the cassettes 1, such that the latter pass through the openings.

The insertion opening 1012 and the output opening 1014 are each sealed against exterior light by means of a pivotable flap 1016. The flaps 1016 engage on the covering wall 63 of the cover 13 of the cassette 1, which covering wall faces away from the read side of the imaging plate. They are so designed that, during insertion and removal of the cassette 1 with the light-shielding cover 3, they bear upon the covering wall 63 in a maximally gapless manner.

After the insertion opening and before the reading device in the transport direction, the transport duct has an oblong region for receiving a plurality of cassettes 1 with light-shielding covers 3. The guide rails are correspondingly elongated in this region.

For the purpose of transporting the cassette 1 in the transport duct, a transport device, having corresponding drive means, is provided in the region of the reading device and erasing device.

During transport, the drive means act exclusively upon the cassette 1, or on the light-shielding cover 3. The imaging plates in the cassette 1 have no direct contact with the drive means.

The reading device comprises a laser 1018, by means of which the imaging plates in the cassette 1 can be scanned in known manner, the light reflected from the imaging plates being able to be acquired by means of a photodetector and the light signals being able to be delivered to a known analysing unit.

The erasing device adjoins the reading device in the transport direction.

As a light source for erasing the imaging plate, the erasing device has a warm-tone fluorescent tube, by means of which illumination densities of 50,000 lm m$^{-2}$ are achieved. This is sufficient to provide the light intensity of approximately 500, 000 lm s required for erasing, and to achieve the short erasing duration required for a quasi-continuous readout process with a high throughput for a multiplicity of imaging plates.

The erasing duration required for erasing is adapted to the readout duration for the imaging plates, which readout duration is limited by the afterglow duration of the storage fluorescent substance to a minimum duration. In the case of imaging plates having the storage fluorescent substance BaF-Br:Eu, the afterglow duration following exposure by means of the laser in the readout process is 680 ns. In the case of the intraoral imaging plates, the readout duration is therefore in the order of magnitude of 10 s.

Fluorescent tubes additionally have a high energy efficiency, and therefore produce only a small amount of heat, such that they do not damage the imaging plates by heating.

An optical edge filter, composed of plastic film, is arranged between the imaging plate to be erased and the florescent tube. By means of this filter, unwanted spectral components are absorbed, and only the wanted spectral components having wavelengths above approximately 480 nm are transmitted. The optical edge filter also prevents crosstalk of the erasing light of the fluorescent tube to the PSL signal of a photodetector of the reading device, because a blue filter preceding the photodetector transmits only wavelengths below approximately 450 nm and thereby blocks the filtered erasing light.

In addition, lifting-magnet axles that reach into the transport duct 1006 are arranged before the reading device 1002 and before the erasing device 1004 for the purpose of separating a plurality of cassettes 1 with light-shielding covers 3 transported in succession. The lifting-magnet axles are controllably connected to a control device 1022. Through interposition of the lifting-magnet axles, processes being executed in succession, namely, the separation of the inserted cassettes 1 from the light-shielding covers 3, the reading-out of the imaging plates and the erasing of the imaging plates, are coordinated and controlled. For this purpose, following further transport of a cassette 1 into the read region 1020 or into the erasing region, the corresponding lifting-magnet axle reaches into the transport duct 1006, behind the cassette 1, and thereby prevents a succeeding cassette 1 from slipping after it into the corresponding function region.

Arranged directly before each function region, in particular before the corresponding lifting-magnet axle, there is a respective light barrier, which light barriers are functionally connected to the control device. By means of the light barriers, it is possible to detect whether further cassettes 1 are in a queue for transfer into the corresponding function region. If no further cassettes 1 are in a queue, the components of the respectively succeeding function regions are then switched to a standby operating mode.

Furthermore, a separating/joining device is provided. By means of the separating/joining device, the cassette 1 can be separated from the light-shielding cover 3 prior to being read-out, and re-joined to this cover after having been erased.

The separating/joining means has a fixing means, by means of which the light-shielding cover 3 can be fixed in position. In addition, it comprises a releasing/locking means, by means of which the cassette 1 can be slid out of and into the fixed light-shielding cover 3.

After the reading device 1002 and the erasing device 1004 in the transport direction, after the output opening 1014 of the transport duct 1006, the transport duct 1006 opens into an output region having a collecting device 1024 for ranging removed cassettes 1 with light-shielding covers 3 in a collecting container 1028 of the collecting device 1024. In the region of the output region, the transport duct 1006 extends vertically with the guide rail 1008.

The collecting device 1024 has a mechanical, automatically actuated slider 1026 for sliding the removed cassettes 1 with light-shielding covers 3. By means of the slider 1026, the cassettes 1 with light-shielding covers 3 in the output region can be pushed away horizontally from the guide rail 1008 by at least the thickness, namely, the dimension in the reading direction 9 in FIG. 1, of the cassettes 1 with light-shielding covers 3, to the collecting container 1028. In the collecting container 1028; the removed cassettes 1 with light-shielding covers 3 can be ranged in succession.

In addition, the collecting device has a multiplicity of mechanical catches, which are arranged in the collecting container in the horizontal direction, their respective spacing being the thickness of the cassettes 1 with light-shielding covers 3. By means of the mechanical catches, the ranged cassettes 1 with light-shielding covers 3 can also be protected against accidents, even in the event of being shaken.

The collecting container furthermore has a grip cutout to facilitate removal of the ranged cassettes 1 with light-shielding covers 3.

The intraoral imaging plates are initially packaged in a light-proof manner in known hygiene sheaths. The first X-ray exposure is effected in the hygiene sheaths.

In order for the imaging plates, previously exposed in known manner, to be inserted into the cassette 1, the cover 13 of the cassette 1 is first brought into the half-open insertion position, in which its spheroidal catch elements 69 engage in the upper cover catch holes 29.

An imaging plate is inserted directly into the cassette 1 in the transverse direction 7 from the opening side, through each of the insertion slots 55, from one of the intraoral hygiene sheaths respectively torn open on one side. In this case, the edges of the imaging plates slide over the top sides of the transverse frame parts 51 in the basic body 11. The cover is then closed 13 fully, the spheroidal catch elements 69 disengaging from the upper cover catch holes 29 and, in the contact position, engaging in the respective lower cover catch holes 31.

In the contact position, the imaging plates are pressed, with the covering wall 63 of the cover 13, against the frame 47 in the basic body 11, and fixed in position.

The filled cassette 1 is then inserted into the light-shielding cover 3. For this purpose, the cassette 1 is first fitted onto the light-shielding cover 3 in the reading direction 9, with the rear halves of the guide webs 37, at the bottom in FIG. 1, foremost in the region of the front straight parts 89 of the light-shielding longitudinal walls 79. The read-side wall 33 of the basic body 11 now bears with positive fit on the light-shielding front wall 77.

The cassette 1 is then pushed in the longitudinal direction 5 relative to the light-shielding cover 3, in the direction of the holding parts 91. In this case, the guide webs 37 are guided in the groove-shaped regions 97 between the holding collars 95 of the holding parts 91 and the light-shielding front wall 77. When the cassette 1 is in the end position in the light-shielding cover 3, the spheroidal catch elements 69 of the light-shielding cover 3 engage in the corresponding basic-body catch holes 39, and fix the cassette 1 in position in the light-shielding cover 3.

Since the guide webs 37 of the basic body 11 are symmetrical and have a respective basic-body catch hole 39 at the front and rear in the longitudinal direction, the cassette 1 can also be pushed into the light-shielding cover 3 with its front side, at the top in FIG. 1, being foremost.

The cassette 1 with the light-shielding cover 3 is then inserted in the longitudinal direction 5, with the front side foremost, into the insertion opening of the transport channel, where it is guided by the guide rails in the transport direction and, driven by gravity, delivered to the read region.

Upon reaching the read region, the cassette 1 with the light-shielding cover 3 is stopped by means of the lifting-magnet axle provided there, and detected by the corresponding light barrier. If the read region is free, i.e. if there is no preceding cassette 1 present there, the lifting-magnet axle is automatically withdrawn out of the transport duct, the cassette 1 is conveyed further and thereafter the lifting-magnet axle is again put into the transport duct in order to prevent after-slippage of any following cassette 1.

The light-shielding cover 3 is automatically fixed in position, at the grip hollows 93 of the holding parts 91, by means of the fixing means of the separating/joining device, and the cassette 1 is automatically pressed out of the light-shielding cover 3 by pressing in the longitudinal direction 5, by means of the releasing/locking means in the region of the releasing hollow 85 in the rear light-shielding transverse wall 83, against the resistance of the spheroidal catch elements 69, and is pushed into the read region by means of the drive means assigned to the reading device.

In the read region, the imaging plates are read out in known manner.

The cassette 1 is then transported to the lifting-magnet axle of the erasing device, where it is detected by the light barrier. If the erasing region is free, the lifting-magnet axle provided in the erasing device is automatically withdrawn out of the transport duct, and the cassette 1 is transported into the erasing region by means of the drive means provided there. The lifting-magnet axle is then automatically pushed back into the transport duct, in order to prevent the after-slippage of a further cassette 1.

In the erasing region, the imaging plates are erased and then conveyed back to the separating/joining device. By means of this device, the cassette 1, with the imaging plates, is pushed back into the light-shielding cover 3.

The cassette 1 with the light-shielding cover 3 is then delivered, via the transport duct and via the output opening of the latter, to the collecting device and appropriately stored in the collecting container. It is removed manually from the container and used directly, without further handling effort by the user, for a new X-ray exposure.

A second exemplary embodiment of a support for an imaging plate 202, described in connection with the first exemplary embodiment and shown in FIG. 6, for use in the drum scanner explained there, is represented in longitudinal section in FIG. 6.

The support 201 has, from the read side, from the top in FIG. 6, as viewed in the reading direction 209, downwards in FIG. 6, a rectangular back wall 263. It is curved in a circular cylindrical form, the corresponding cylinder axis on the read side extending in the longitudinal direction 205, horizontally in FIG. 6. The centre of curvature corresponds to the centre of curvature of the circular cylindrical surfaces in the first exemplary embodiment, i.e. to the centres of curvature required for the drum scanner.

In FIG. 6, the back wall 263 is bounded on the left and right by a respective transverse wall 221. On the read side, the transverse walls 221 extend perpendicularly relative to the back wall 263.

In the transverse direction 207, perpendicularly relative to the plane of the drawing in FIG. 6, the transverse walls 221 extend over the full width of the back wall 263 and follow its curved course in the form of a circular arc, as viewed in the longitudinal direction 205.

In their mutually facing inner faces, the transverse walls 221 have a respective groove 247, which extends over the full length of the transverse walls 221 in the transverse direction 207 and is open at end faces. The inner faces of the grooves 247 are coated with a rubber-elastic material which does not damage the edges of the inserted imaging plate 202.

The contours of those walls of the grooves 247 which face away from the read side merge steplessly in each case into the contour of the read-side face of the back wall 263.

The widths of the grooves 247 in the reading direction 209 correspond to the thickness of the imaging plate 202. The extent in the longitudinal direction 205 of the region between the bases of the grooves 247 is of exactly the same magnitude as that of the imaging plate 202, such that the inserted imaging plate 202 is held between the grooves 247 by friction. The extent of the back wall 263 in the transverse direction 207 is at least as great as the corresponding extent of the imaging plate 202.

The imaging plate 202 is inserted by its edges into the grooves 247 of the support in the transverse direction 207, in such a way that its read side faces away from the back wall 263. The imaging plate 202 is held in its end position between the grooves 247.

In the case of a modification that is not represented, a longitudinal wall, extending in the longitudinal direction on a longitudinal side of the back wall, is provided in addition to the transverse walls. The longitudinal wall has a corresponding longitudinal groove which connects the grooves in the transverse walls and has the same profile. In the longitudinal groove, the inserted imaging plate is held on the longitudinal side.

In the case of a third exemplary embodiment, represented in FIG. 7, those elements which are similar to those of the second exemplary embodiment described in connection with FIG. 6 are denoted by the same reference numerals incremented by 100, such that, with regard to description of these elements, reference is made to the statements relating to the second exemplary embodiment.

This exemplary embodiment differs from the second in that the grooves 347 are realized, not in the transverse walls 321, but in spring catch elements 340 which are displaceable relative to the transverse walls 321 and the back wall 363.

In the third exemplary embodiment, the grooves 347 are bounded in the reading direction 309 on the read side and in the transverse direction 307 by the spring catch elements 340, which have an L-shaped profile. On the sides facing away from the read side, they are bounded by the read-side back wall face.

The spring catch elements 340 are displaceably connected to the transverse walls 21 via a multiplicity of guide pins 342 arranged in succession in the transverse direction 307. The axes of the guide pins 342 extend in the longitudinal direction 305.

The guide pins 342 are surrounded by helical compression springs 344, the ends of which act respectively upon the transverse walls 321 and upon the spring catch elements 340. By means of the helical compression springs 344, a spring force can be generated in the longitudinal direction 305 between the transverse walls 21 and the displaceable spring catch elements 340.

The helical compression springs 344 having been constrained, the region bounded by the opposing grooves 247 in the longitudinal direction 305 is somewhat narrower than the corresponding extent of the imaging plate 302. Upon insertion of the imaging plate 302 in the transverse direction 307, perpendicularly relative to the plane of the drawing in FIG. 7, the spring catch elements 340 are forced apart by the imaging plate 302, against the spring force of the helical compression springs 344, and the helical compression springs 344 become biased. The imaging plate 302 is then clamped in its end position between the displaceable spring catch elements 340.

In the case of a modification of the third exemplary embodiment that is not represented, the longitudinal walls can also in addition be provided with corresponding spring catch elements. For the purpose of inserting the imaging plate, all spring catch elements are then forced apart manually, and the imaging plate is inserted from the read side, in the reading direction. As soon as they are released, the helical compression springs become decompressed and clamp the imaging plate in a manner analogous to that of the third exemplary embodiment.

In the case of a fourth exemplary embodiment, not represented, a fixed transverse wall, according to the second exemplary embodiment explained in connection with FIG. 6, is provided on one side, and a transverse wall having a displaceable spring catch element, according to the third exemplary embodiment explained in connection with FIG. 7, is provided on the opposite side. Insertion and holding of the imaging plate are effected accordingly.

Instead of only one spring catch element 240; 340 per side, a multiplicity of separate spring catch elements can also be provided in the second, third and fourth exemplary embodiments.

In the second and third exemplary embodiments, the grooves 247 and the spring catch elements 340, respectively, can also be assigned to longitudinal walls instead of to the transverse walls 221 and 321 respectively.

Instead of the frame 47 according to the first exemplary embodiment, the grooves 247 or the spring catch elements 340 according to the third and fourth exemplary embodiments, respectively, a support can have a magnetically acting holding means for the purpose of holding the imaging plate 202; 302 in the support, in particular at least a part of the support can be permanently magnetic and the imaging plate 202; 302 can be coated with a diamagnetic film on its back side that faces away from the read side. The imaging plate 202; 302 is then attracted by magnetic forces to the corresponding surface of the support, and held there. For the purpose of positioning, the imaging plate 202; 302 is placed onto a guide edge.

In the case of a further exemplary embodiment, not represented, a support comprises an electrostatically charged surface, having a first function layer, for holding an imaging plate. A second function layer, which cooperates with the first function layer, is provided on the back side of the imaging plate which faces away from the read side.

In the support, on one side of the receiving region for receiving the imaging plate, there is a guide edge, onto which the corresponding edge of the imaging plate is placed for the purpose of positioning the latter.

As an alternative or in addition to the function layers or magnetic holding means, the support can have, in the receiving region for receiving the imaging plate, a renewable adhesive layer of double-sided adhesive film. The adhesive layer is then renewed when the imaging plate is replaced, and the support and the imaging plate can be reused.

In the case of another exemplary embodiment, likewise not represented, the support comprises a spring plunger, by means of which a negative pressure can be applied to the region between a smooth back side of the imaging plate and the corresponding bearing surface of the support. This region is additionally sealed with O-rings. When being inserted into the support, the imaging plate is positioned on a guide edge and fixed in place on the corresponding surface of the support by the negative pressure. Instead of the spring plunger and the O-rings, other types of holding means that act with a negative pressure and have sealing means can also be used here.

In the case of a further exemplary embodiment, not represented, a support has lockable articulations, by means of which it is divided into a plurality of regions that can be pivoted relative to one another. Through pivoting of the regions relative to one another, the support can be adapted to a receiving geometry of the readout device, in particular of the scanner. For example, the support can be brought into a cylindrical shape or a flat shape and is thus universally applicable in the case of, optionally, a drum scanner, described above in connection with the first exemplary embodiment, or a flatbed scanner.

In addition, in the case of use of imaging plates having large-area, flat exposure geometries, for example panoramic, cephalometric or other medical formats, prior to exposure the support can thus be pre-equipped with a corresponding light-shielding cover 3, preferably such a cover that can be stripped off. By means of the articulations, the support can then be brought into the shape required for the reading device.

In the case of all of the exemplary embodiments described above, a plate transport duct for imaging plates that are delivered without a support can also be provided, in addition to the transport duct for cassettes with or without a light-shielding cover. In the region of a correspondingly shaped reading device, which can also be combined with the reading device for the cassettes with imaging plates, and with an erasing device, the plate transport duct has an additional plate drive means 560, represented in FIG. 8.

Figure 8:
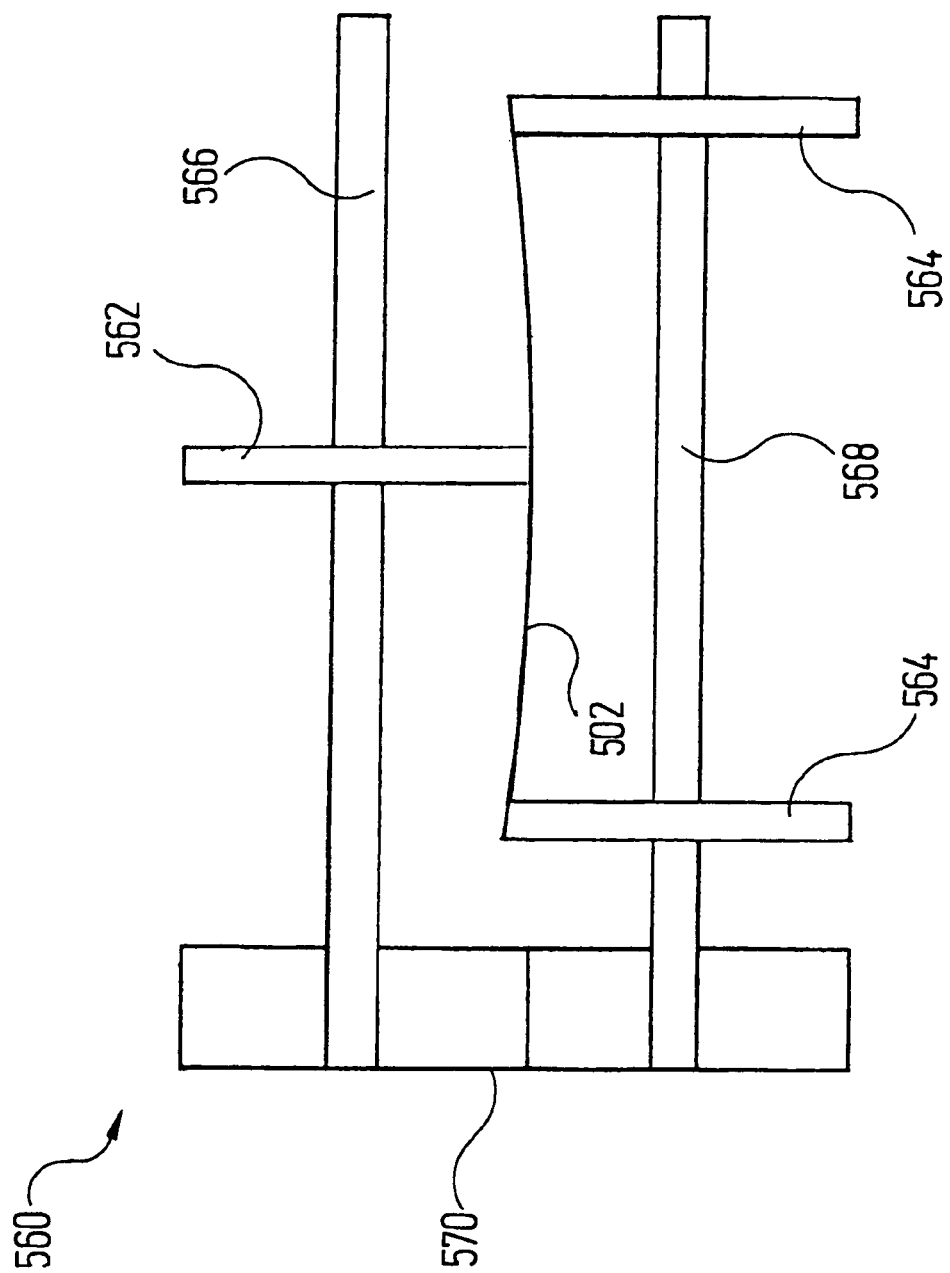
FIG. 8 shows, in schematic form, a section perpendicular to the transport direction of a drive means of a scanner for imaging plates without a support.

The plate drive means 560 comprises, at the top in FIG. 8, a single pressure wheel 562 and, at the bottom, two drive wheels 564. In FIG. 8, between the drive wheels 564 and the pressure wheel 562, the imaging plate 502 can be transported horizontally into and out from the plane of the drawing.

The single pressure wheel 562 is arranged so as to be freely rotating on a horizontal axle 566. The two lower drive wheels 564 are fixed on a common horizontal drive axle 568, which is driven via a transmission 570, on the left in FIG. 8, preferably a toothed gear transmission or friction gear transmission, preferably having an electric motor, which likewise is not shown. The axle 566 is mounted in a holding plate of the transmission 570.

The edge of the single pressure wheel 562 projects into the region between the two lower drive wheels 564, as a result of which the imaging plate 502 is brought into a curved, cylindrical surface shape which is concave as viewed from the read side, from the top in FIG. 8, in correspondence with the cylindrical shape of the drum scanner.

The edges of the pressure wheel 562 and of the drive wheels 564 that are in contact with the imaging plate 502 are coated with an elastic material, preferably rubber or silicone, which produces a strong driving force.

By means of the plate driving means 560, the imaging plate 502 can be guided, in the otherwise not represented scanner, along a guide rail or guide groove and over a read slot of the reading device and, if necessary, in the region of a corresponding erasing device.

The plate transport duct additionally has an air bearing guide for the imaging plate 502, by means of which it can be delivered to the plate drive means 560 without contact for the read side.

By means of a correspondingly directed air flow, the imaging plate 502, irrespective of its format, is forced laterally into the plate transport duct in the direction of the guide rail, and guided along the latter.

Instead of the plate drive means 560 having the combination of drive wheels and pressure wheels 562, 564; a roller drive can also be used for imaging plates without a support.

In the case of use of circular scanning, as in the case of a drum scanner, in combination with flat rollers, the focal depth, for example of a laser beam of the reading device, is preferably greater than the distance between, on the one hand, the focus of the detector optics present on a circular path around the detector and, on the other hand, the read-side flat surface of the imaging plate.

In order that the distance between the imaging plate and a read slot of the reading device is not altered when the imaging plate comes into contact with a second pair of rollers, a guide rail is provided on one side, by means of which guide rail the imaging plate is guided in the transport direction. In this case, only the back side, facing away from the read side, and the corresponding edge of the imaging plate come into contact with the guide rail.

A pair of input rollers is aligned in such a way that the imaging plate is forced, by its back side, away from the read slot and towards the guide rail, whereby it is ensured that the read side runs along the read slot, in particular at a constant distance from, and preferably without coming into contact with the read slot. In this way, scratching of the read side of the imaging plate is prevented. In addition, the distance between the read side of the imaging plate and the laser and detector of the reading device is kept constant.

The imaging plates without a support can also be guided on transport belts or on a driven roller line (similar to a film projector) or on a wheel line.

In addition, in the case of all exemplary embodiments, the guide means, in particular the guide rails in the transport duct, can be bidirectional. Following the readout operation, the support 1, 201, 301, or the imaging plate 502 without a support, is then guided back out of the opening into which said support or imaging plate was inserted.

The separation of the support 1, 201, 301 or of the imaging plate from the light-shielding means 3 can then be effected immediately after the combined insertion/discharge opening in the insertion transport direction, and before the combined insertion/discharge opening in the discharge transport direction.

Following completion of the readout/erasing operation, the support 1, 202, 301 can then be conveyed back into the light-shielding means 3, which is positioned, ready to receive the support, before the insertion/discharge opening in the discharge transport direction.

Instead of being provided for two imaging plates, a support can also be provided for only one or more than two imaging plates.

The device can also be used for reading out imaging plates other than intraoral imaging plates, for example imaging plates for use in other medical or non-medical domains.

The imaging plates can also be non-flexible.

They can also be in a form other than a rectangular form.

Instead of the drum scanner, a different type of device can also be provided for reading out imaging plates, for example a flatbed scanner. The shape of the support is then adapted in correspondence with the device. In the case of flatbed scanners, for example, the read-side surfaces are flat instead of being curved in a circular cylindrical form.

The size of the support can be predefined in dependence on the size of the imaging plate. It can range, for example, from small intraoral dental formats having surface areas of 20 mm×30 mm to large plate formats of 350 mm×430 mm.

The imaging plate, instead of being insertable into the support from the hygiene sheath, can also be inserted from a different type of sheath. It is also possible to dispense with use of the sheath.

In the case of the first exemplary embodiment, explained in connection with FIGS. 1 to 5, the cassette 1 can have, instead of or in addition to the frame 47 on the side facing towards the read side of the imaging plate, i.e. on the scanning side, at least one glass-clear plate which is flat or curved, and in particular is scratch-resistant and dirt-repellent, on which the imaging plate can be positioned.

The insertion slots 55 in the cover 13 of the cassette 1 according to the first exemplary embodiment can also have a preferably light-proof flap or brush.

The supports 201, 301, or the imaging plate 502 without a support, according to the second, third and fourth exemplary embodiments can have protective means, in particular light-shielding means, that are likewise removable in a manner similar to that of the cassette 1 according to the first exemplary embodiment.

The protective means, instead of having a positive-fit connection element for connection to the support corresponding to the holding part 91 with the groove-shaped region 97 according to the first exemplary embodiment, can also have a magnetically or adhesively acting connection element, for connection to the support, in particular a connection element provided with an adhesive layer.

The connection element can also be manually detachable. Instead of the positive-fit sliding connection as in the case of the first exemplary embodiment, a plug-in connection can also be provided.

The protective means, in particular the light-shielding front wall 77 of the light-shielding cover 3, instead of being composed of aluminium can also be composed of another material having a high X-ray transparency, for example of carbon-fibre filled plastic. It can also be completely non-transparent to radiation. Instead of being in the form of an X-ray cassette, the protective means with the support can also have a form of a different type.

The support can also be in such a form that, in the case of use of other imaging plate formats, it can optionally be loaded with only one or a multiplicity of imaging plates.

The outer dimensions of the support can also differ from conventional dimensions; preferably, the support is adapted or adaptable to a device in use, in particular to the scanner in use.

Instead of being sealed with a pivotable flap, the insertion opening and/or the output opening of the transport duct, or of the plate transport duct, can also be sealed with a sliding flap or a brush.

The surface of the guide means, in particular of the guide rails, can also be composed of PTFE and, instead of this, the surface of the support can be composed or hard-anodized aluminium. Other material pairings that realize a small coefficient of sliding friction, for example POM on steel, can also be used.

Means of other types can also be used for reducing the friction during transport. For example, the support and/or the guide means can have, in adjoining regions, continuous ball guides or magnetically acting support guide elements, or support guide elements with air bearings. The support can also be fitted with wheels which are mounted on ball bearings and run on the guide rails or in guide grooves.

The guide means, in particular the guide rails in the transport duct, in addition to or instead of extending after the insertion opening, can also extend before the insertion opening in the transport direction, in a region outside of the transport duct, whereby the receiving region for receiving a multiplicity of supports is increased significantly.

As an alternative to the lifting-magnet axles that reach into the transport path, other types of separating mechanisms, for example levers attached to motor axles, can also be used.

Instead of or in addition to the light barriers, means of other types, for example mechanical sensors, can also be provided for determining the position of the supports.

The device for reading out the imaging plates, in particular the scanner, can also have no erasing device, or a different type of erasing device.

Instead of the warm-tone light tube in the erasing device, a different fluorescent tube having a small blue and UV spectral component, for example a tube coated with only red fluorescent substance, can also be used.

In order to achieve even shorter erasing times, a halogen torch can also be used instead of the warm-tone fluorescent tube. such a torch has a higher power consumption and higher light output intensity relative to the surface area of its emitter.

The lamp housing can preferably be composed of a material that is highly reflective of the erasing light, for example of warm or yellow foam, white Teflon, bright-polished aluminium plate, or of any support material that is coated with a reflective coating, for example of $BaSO_4$, particularly mixed with a yellow dye.

The edge filters, instead of being composed of plastic film, can also be composed of a different type of material, for example also of glass having the corresponding optical characteristics.

The removed supports, instead of being ranged in succession, can also be stacked one upon the other, with use of an alternative collecting device. In this case, the collecting device has means for tilting the supports and laying them down in horizontal layers.

In order that all supports tilt successively to the same level, means for height compensation can be provided, for example a spring-loaded bearing surface beneath the stack. The spring-loaded bearing surfaces goes down by one support thickness when a further support is laid on the stack, and the applied weight is thus increased by that of one support. In this way, the respectively uppermost support is always at the same level.

Instead of the mechanical catches, the collecting device can also have other types of protective means for removed supports.

The transport path, the transport device, the reading device, the erasing device and/or the collecting device for supports, and those for imaging plates without a support, can be similar or differing structure. All components, and their alternatives, described in connection with the exemplary embodiments can also be combinable with one another. The transport path, the transport device, the reading device, the erasing device and/or the collecting device can also be of a universal structure, at least in part, such that they can be used optionally for the supports or for the imaging plates without a support.

The supports according to the invention can also be used in combination with other in particular known readout devices, in particular known drum scanners or flatbed scanners.

Instead of use of a scanning reading device, it is also possible to use a reading device by means of which the image information can be read out in one piece. For example, a light source that exposes the entire image area of the imaging plate can be used in combination with a planar detector, for example a CCD chip.

It is again emphasized that the above-described embodiments of the present invention, particularly, any "preferred" embodiments, are possible examples of implementations merely set forth for a clear understanding of the principles of the invention. Many variations and modifications may be made to the above-described embodiments of the invention without substantially departing from the spirit and principles of the invention. All such modifications are intended to be included herein within the spirit of the invention and the scope of protection is only limited by the accompanying claims.

The invention claimed is:

1. A device for reading out at least one flexible imaging plate, the device comprising:
    a reading device for reading out information stored on the imaging plate, wherein the reading device comprises a reading region with a cylindrical shape, and,
    a transport device having at least one drive means for transporting the imaging plate relative to the reading device along a guide means on a transport path, the shape of which is adapted to the cylindrical shape of the reading region of the readout device, and,
    at least one substantially rigid support which has a support face and is capable of being fed to the transport device together with the imaging plate on the support face, wherein the shape and dimensions of the support face are adapted to the cylindrical shape of the reading region and the imaging plate does not come into contact with the drive means when the imaging plate is transported with the at least one substantially rigid support.

2. The device of claim 1, further comprising an additional drive means capable of transporting along a second guide means on a second transportation path imaging plates without a substantially rigid support which are fed into the device.

3. The device of claim 2, further comprising a region, before the reading device in the transport direction, for receiving a multiplicity of supports or imaging plates without a support.

4. The device of claim 2, further comprising an air-bearing guide for the support, or for the imaging plate without a support.

5. The device of claim 2, further comprising a lateral air flow in the direction of an appliance of the guide means for the support, or for the imaging plate without a support.

6. The device of claim 2, further comprising separating mechanisms in the transport path for separating a multiplicity of supports, or imaging plates without a support, that are guided in succession along the transport path.

7. The device of claim 2, further comprising at least one means, for the purpose of determining the position of the support, or of the imaging plate without a support.

8. The device of claim 2, further comprising a collecting device for removed supports, or for imaging plates without a support, after the reading device in the transport direction, said collecting device having, a mechanical, automatically actuated slider for sliding the removed supports, or imaging plates without a support.

9. The device of claim 8, wherein the collecting device is realized as a stacking device for stacking the removed supports, or imaging plates without a support, and has a means for height compensation.

10. The device of claim 8, wherein the collecting device has a supporting means for removed supports, or removed imaging plates without a support.

11. The device of claim 8, wherein the collecting device has at least one grip cutout as an aid for removal of the supports, or of the imaging plates without a support.

12. The device of claim 1, wherein the imaging plate is an intraoral imaging plate.

13. The device of claim 1, wherein the imaging plate can be detachably connected to the support.

14. The device of claim 1, wherein the support is in the form of a cassette and has at least one slot through which the imaging plate can be inserted into the support from a sheath.

15. The device of claim 1, wherein the support has, on the side which faces towards a read side of the imaging plate, at least one frame on which the imaging plate is positioned.

16. The device of claim 1, wherein the support has, on the side which faces towards the read side of the imaging plate, at least one glass-clear plate which is flat or curved in correspondence with the reading device.

17. The device of claim 1, wherein the support has a lockable cover, by means of which the imaging plate can be fixed in position in the support.

18. The device of claim 1, wherein the support has at least two grooves for receiving at least two opposing edges of the imaging plate.

19. The device of claim 1, wherein the support has a magnetically acting holding means for holding the imaging plate.

20. The device of claim 1, wherein the support comprises at least one electrostatically charged surface for holding the imaging plate, the surface having a first electrostatically charged function layer, and, on the back side of the imaging plate which faces away from the read side, a second function layer which cooperates with the first function layer.

21. The device of claim 1, wherein the support has an adhesive layer which holds the imaging plate.

22. The device of claim 1, wherein the support comprises a holding means which acts with negative pressure to hold the imaging plate which has a smooth back side, the holding means having a spring plunger for generating a negative pressure, and sealing means for sealing a region which is subjected to the negative pressure and which adjoins the back side of the imaging plate.

23. The device of claim 1, wherein the support has at least one guide edge as a positioning edge for the imaging plate.

24. The device of claim 1, wherein the support has at least one clamping device for holding the imaging plate, the clamping device comprising two cooperating clamping elements, which are assigned to opposing edges of the imaging plate, or one clamping element and a guide rail which cooperates therewith and is assigned to an edge of the imaging plate opposite the clamping element, the regions of the clamping device which act upon the edges of the imaging plate include a rubber-elastic material.

25. The device of claim 1, wherein the drive means for supports and/or the additional drive means for imaging plates without a support comprises at least one transport belt or at least one driven roller arrangement or wheel arrangement.

26. The device of claim 1, wherein the support comprises a multiplicity of slide blocks which are attached to the imaging plate and can be inserted into circular guide rails, and the drive means is a displacement table which is coupled to a threaded spindle and fixedly connected to the circular guide rail.

27. The device of claim 1, wherein the support, or the imaging plate without a support, has a removable protective means having a connection element for connection to the support.

28. The device of claim 27, wherein the protective means is thin-walled and composed of a material of high X-ray transparency.

29. The device of claim 27, wherein the protective means is in the form of an X-ray cassette and has inner guide means for the support or for the imaging plate.

30. The device of claim 1, wherein the support has at least one lockable articulation, by means of which it can be adapted to a profile of the transport path.

31. The device of claim 1, wherein the support has standardized outer dimensions.

32. The device of claim 1, wherein a front side of the support fits positively to a back side of the support and/or of a protective means.

33. The device of claim 1, further comprising at least one slot-shaped opening in a housing of the device, for inserting and/or removing the support or the imaging plate without the support, which can be opened in a light-proof manner.

34. The device of claim 1, wherein the guide means for the support and/or for the imaging plate without a support has at least one guide rail or guide groove.

35. The device of claim 1, wherein mutually contacting surfaces of the guide means and of the support that slide relative to each other have a materials pairing, which realizes a small coefficient of sliding friction.

36. The device of claim 1, wherein the support and/or the guide means has/have, in mutually adjoining regions, circumferential ball guides or magnetically acting support guide elements, or support guide elements with air bearings.

37. The device of claim 1, wherein the support includes ball-bearing mounted wheels, which run on guide rails or in guide grooves of the guide means.

38. The device of claim 1, wherein at least a part of the transport path extends in the form of a meander.

39. The device of claim 1, wherein the transport path extends at least partially in an internally blackened transport duct.

40. The device of claim 1, wherein contacting regions of the drive means, or of the additional drive means, which regions drive the support or the imaging plate without a support, are coated with an elastic material, which produces a strong driving force.

41. The device of claim 1, wherein the transport path extends substantially vertically from top to bottom.

42. The device of claim 1, further comprising an erasing device for erasing the imaging plate, which erasing device is arranged after the reading device in the transport direction.

43. The device of claim 1, wherein the guide means is bidirectional, at least in part, and the guide means acts bidirectionally.

44. The device of claim 1, further comprising a control device.

* * * * *